United States Patent
Bovi

(10) Patent No.: US 9,067,642 B2
(45) Date of Patent: Jun. 30, 2015

(54) DRIVE TRANSMISSION GROUP TO A STEER WHEEL OF A VEHICLE

(71) Applicant: EUROSYSTEMS S.P.A., Reggio Emilia (IT)

(72) Inventor: Fabio Bovi, Reggio Emilia (IT)

(73) Assignee: EUROSYSTEMS S.P.A., Luzzara, Reggio Emilia (IT)

( * ) Notice: Subject to any disclaimer, the term of this patent is extended or adjusted under 35 U.S.C. 154(b) by 0 days.

(21) Appl. No.: 14/276,095

(22) Filed: May 13, 2014

(65) Prior Publication Data

US 2014/0335982 A1    Nov. 13, 2014

(30) Foreign Application Priority Data

May 13, 2013    (IT) ............................... RE2013A0032

(51) Int. Cl.
*B62M 1/36*    (2013.01)
*B62M 23/00*    (2006.01)

(52) U.S. Cl.
CPC *B62M 1/36* (2013.01); *B62M 23/00* (2013.01)

(58) Field of Classification Search
USPC .................... 280/259, 260, 261, 262; 474/58
See application file for complete search history.

(56) References Cited

U.S. PATENT DOCUMENTS

| 6,062,581 A | 5/2000 | Stites | |
| 6,095,540 A * | 8/2000 | Kim | 280/259 |
| 8,226,103 B2 * | 7/2012 | Reyes | 280/281.1 |
| 2006/0125205 A1 * | 6/2006 | Lai | 280/259 |
| 2010/0200322 A1 | 8/2010 | Lawson | |

FOREIGN PATENT DOCUMENTS

| JP | 09104385 A | * | 4/1997 | B62M 17/00 |
| WO | 2006106592 A1 | | 10/2006 | |

OTHER PUBLICATIONS

European Search Report Dated Jul. 16, 2014. Application No. EP14167946.

* cited by examiner

*Primary Examiner* — Kevin Hurley
(74) *Attorney, Agent, or Firm* — Browdy and Neimark, PLLC

(57) ABSTRACT

A drive transmission group to a steer wheel of a vehicle at least a drive chain ring associable to actuating means in rotation able to impart a rotary motion to the chain ring, at least a driven chain ring solidly associated in rotation coaxially to the steer wheel, at least a first intermediate chain ring and a second intermediate chain ring connected respectively to the drive chain ring and to the driven chain ring by means of respective flexible organs, a universal joint comprising a joint spider on a first arm of which the first intermediate chain ring is associated, rotatably with respect to an axis of the first arm, and on a second arm of which the second intermediate chain ring is associated, rotatably with respect to an axis of the second arm, wherein the first intermediate chain ring is concentric to the spider.

12 Claims, 6 Drawing Sheets

DRIVE TRANSMISSION GROUP TO A STEER WHEEL OF A VEHICLE

TECHNICAL FIELD

The present invention relates to a drive transmission group to a steer wheel of a vehicle.

In greater detail, the invention relates to a drive transmission group to a steer wheel of a three-wheeled vehicle, such as a tricycle (also "recumbent bike" or "trike"), an assisted-pedal bicycle, a motor cycle or the like.

PRIOR ART

Vehicles for transport of persons are known, such as recumbent bicycles or trikes, assisted-pedal bicycles or motorcycles, having three wheels, for example two rear wheels and a steering front wheel.

These vehicle are classified in two main categories, of which a first category known as "rear wheel drive", in which the drive wheels are the rear wheels, and a second category known as "front-wheel drive", in which the drive wheel is the front wheel.

In particular, the present invention relates to those vehicle in which the steer wheel is also the drive wheel, and in particular those front-wheel traction vehicles in which the front wheel is the steer wheel.

These vehicles, though known, are rare as they are difficult to construct and exhibit considerable structural limitations, in particular in relation to the maximum steering radius possible with the drive transmission mechanisms to the front wheel.

In particular, U.S. Pat. No. 6,062,581 discloses a drive transmission group going from the pedals (and/or the motor if provided) to a steer wheel of a vehicle comprising:
- a drive chain ring solidly associated in rotation coaxially to the front steer wheel,
- a driven chain ring solidly associated in rotation coaxially to the front steer wheel,
- at least a first intermediate chain ring and a second intermediate chain ring respectively connected to the drive chain ring and the driven chain ring by means of respective chains,
- a universal joint, which comprises a spider centred on the steering axis of the steer wheel.

The first intermediate chain ring is associated via a first fork to a first arm of the spider, rotatably with respect to the axis of the first arm, and the second intermediate chain ring is associated via a second fork to a second arm of the spider, rotatably with respect to the axis of the second arm.

The arrangement of the first intermediate chain ring is therefore offset with respect to the central longitudinal plane of the vehicle and consequently also the drive chain ring, which must be parallel and aligned as much as possible to the first intermediate chain ring, is necessarily offset with respect to the central longitudinal plane with a consequently greater discomfort in pedalling by the user.

Further, in order to support the first and the second fork bearings are necessary (two in number for each fork), which being very near to one another must support heavy loads and therefore be of large dimensions.

Further, in these known-type vehicles it is not possible to insert a suspension on the front drive wheel, and this makes the vehicle particularly sturdy and not very comfortable.

An aim of the present invention is to obviate the above-mentioned drawbacks in the prior art, with a solution that is simple, rational and relatively inexpensive.

The aims are attained by the characteristics of the invention reported in the independent claim. The dependent claims delineate preferred and/or especially advantageous aspects of the invention.

DISCLOSURE OF THE INVENTION

In particular, the invention provides a drive transmission group to a steer wheel of a vehicle which comprises:
- at least a drive chain ring associable to actuating means in rotation able to impart a rotary motion to the chain ring,
- at least a driven chain ring solidly associated in rotation coaxially to the steer wheel,
- at least a first intermediate chain ring and a second intermediate chain ring connected respectively to the drive chain ring and to the driven chain ring by means of respective flexible organs,
- a universal joint comprising a joint spider on a first arm of which the first intermediate chain ring is associated, rotatably with respect to an axis of the first arm, and on a second arm of which the second intermediate chain ring is associated, rotatably with respect to an axis of the second arm.

According to the invention, the first intermediate chain ring is concentric to the spider.

With this solution, apart from obviating the problems of the prior art, it is possible to reduce the spatial encumbrance of the transmission group, the stresses on the organs thereof and minimizing the problems of balancing.

In a further aspect of the invention, revolving organs are interposed between the first arm and the first intermediate chain ring.

The revolving organs advantageously comprise at least a pair of bearings respectively associated to opposite ends of the first arm and in diametrically opposite points of the first chain ring.

In this way the mechanical friction between the moving organs can be reduced and at the same time the sturdiness of the transmission group is increased.

In a further aspect of the invention a vehicle is provided (for example a three-wheeled vehicle) comprising a frame supported by at least a rear wheel (for example 2 in number) and at least a front steer wheel (for example a single front wheel) which comprises a transmission group as described above.

The vehicle advantageously comprises actuating means mechanically connected to the drive chain ring for activating said ring in rotation.

For example, the actuating means comprise a pair of pedals rotatably associated to the frame and coaxially solid to the drive chain ring.

Additionally or alternatively, the actuating means comprise at least a motor.

In a still further aspect of the invention, the vehicle comprises a fork able to rotatingly support the front wheel and hinged to the frame with respect to a steering axis, the universal joint being directly supported by the fork.

With this solution, it is possible to reduce the risk of interference between the parts in motion, in particular the second flexible organ, with the frame or other fixed parts during the steering.

In practice, the universal joint is associated to the fork in a zone thereof located inferiorly, along the steering axis, with respect to the hinging point of the fork to the frame.

The second arm of the spider is advantageously hinged, with respect to the axis of the second arm, to a fork organ of the universal joint, which in turn is supported rotatably by the fork of the vehicle.

In a further aspect of the invention, the vehicle comprises limiting means of the rotation of the first intermediate chain ring with respect to the steering axis.

With this solution, the risk of the first flexible organ detaching from the drive chain ring and the first intermediate chain ring can be eliminated.

In a preferred embodiment, the limiting means comprise at least a longitudinal appendage inserted in a sleeve fixed to the frame and provided with a cradle able to embrace the first intermediate chain ring from opposite sides.

Further, the cradle advantageously comprises revolving means able to roll, substantially without dragging, on the lateral walls of the first intermediate chain ring.

In this way, even during steering of the vehicle the frictions in play are small, which results in a fluid and comfortable guide of the vehicle.

The appendage is also slidably associated to the frame with respect to the longitudinal axis of the appendage.

In this way the vehicle forks can be suspended, with a greater comfort for those in the vehicle.

BRIEF DESCRIPTION OF THE DRAWINGS

Further characteristics and advantages of the invention will emerge from a reading of the following description provided by way of non-limiting example, with the aid of the figures of the accompanying tables of drawings.

BEST WAY OF CARRYING OUT THE INVENTION

Figure 1:
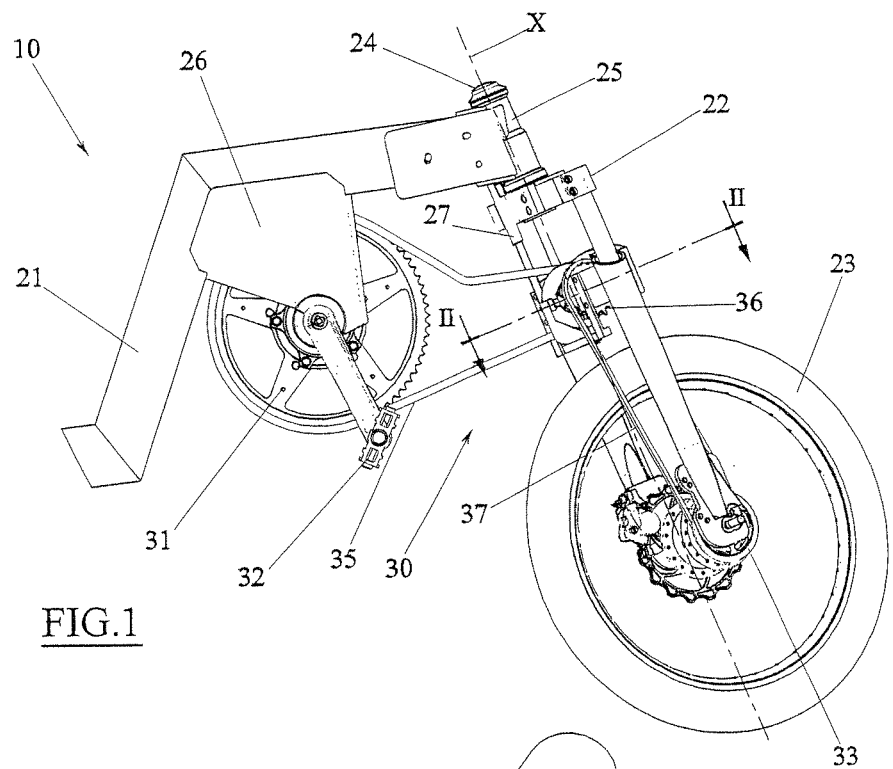
FIG. 1 is a lateral view of the front portion of the vehicle of the invention.
Figure 2:
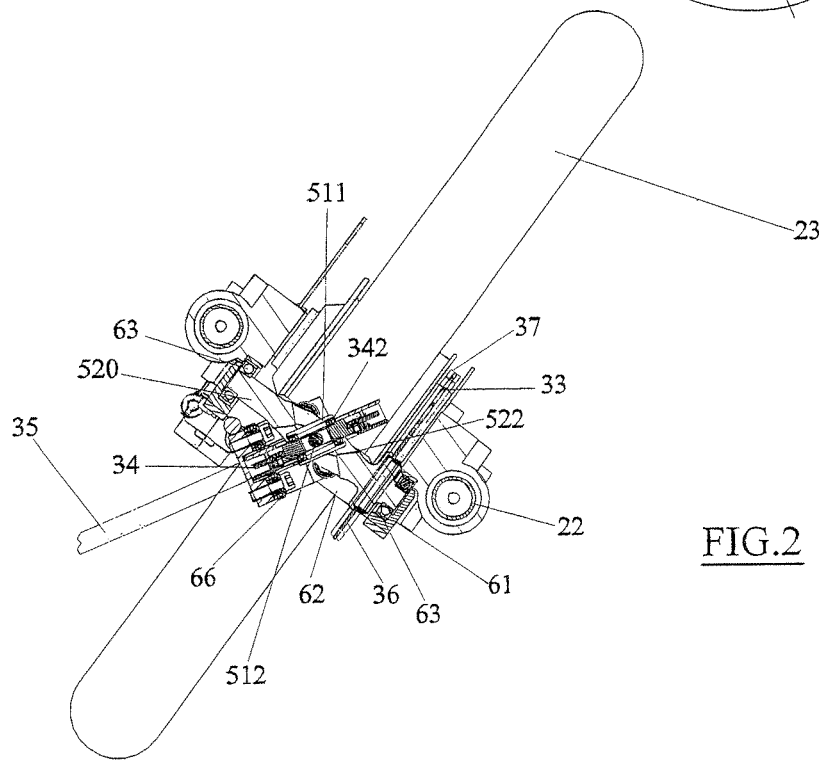
FIG. 2 is the view along section line II-II of FIG. 1.
Figures 3, 4:
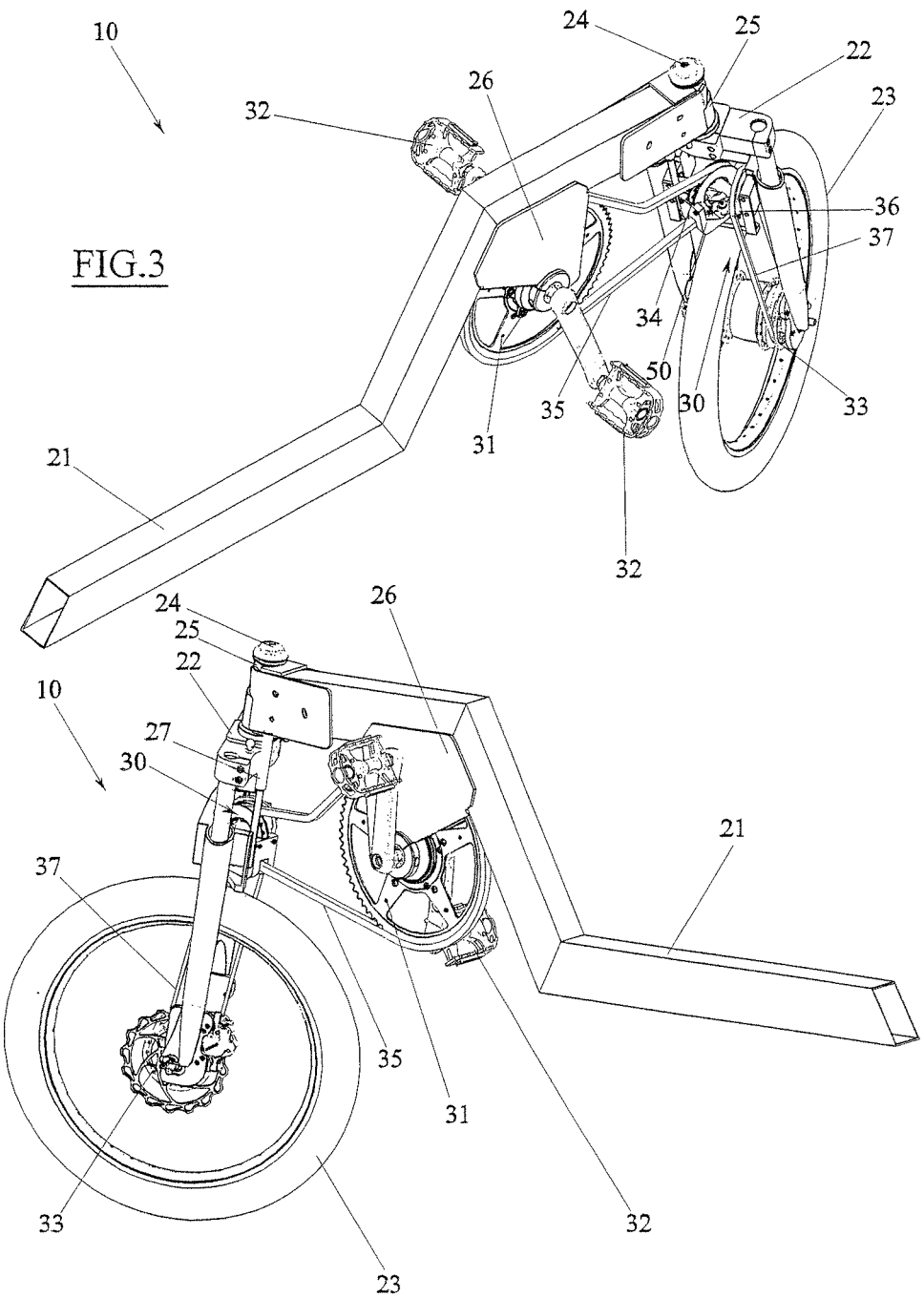
FIG. 3 is a first axonometric view of FIG. 1.
FIG. 4 is a second axonometric view of FIG. 1.
Figure 5:
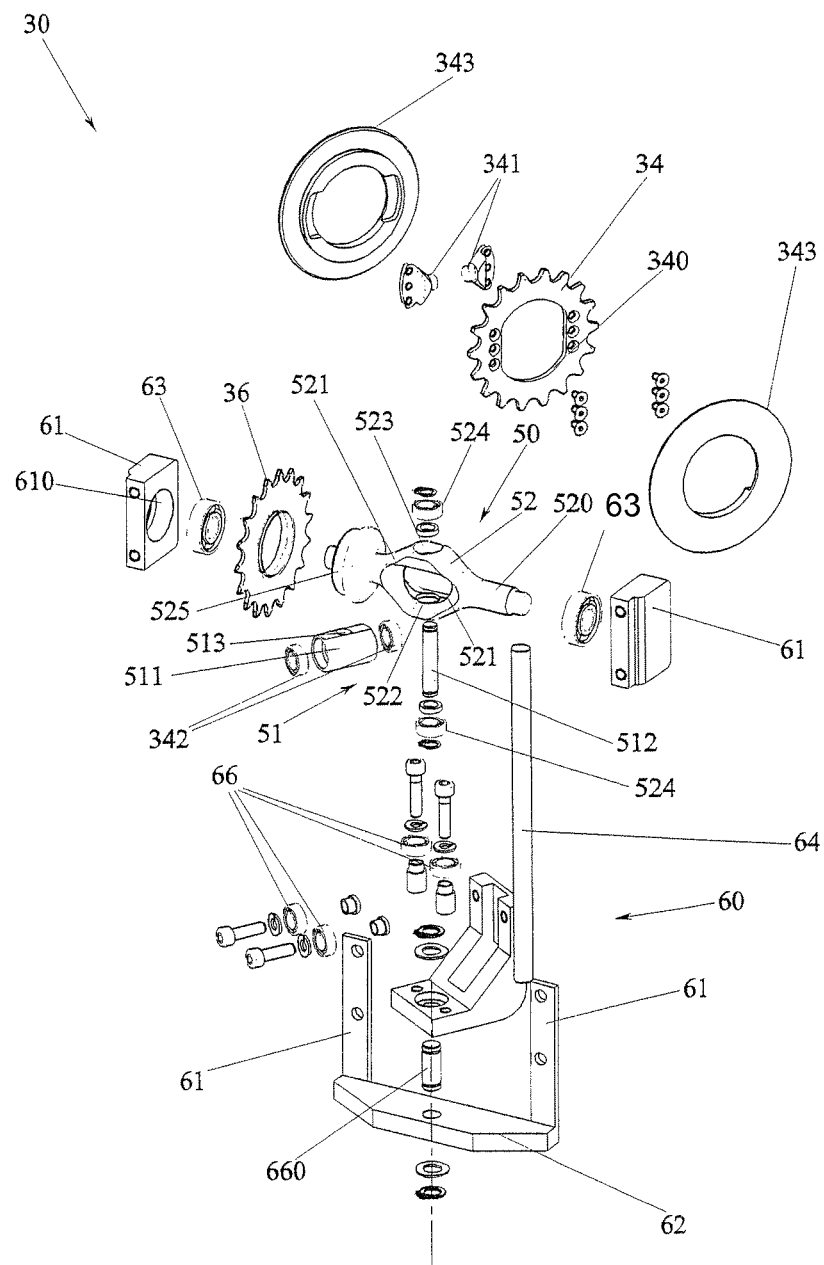
FIG. 5 is an exploded view of the drive transmission group according to the invention.
Figure 6:
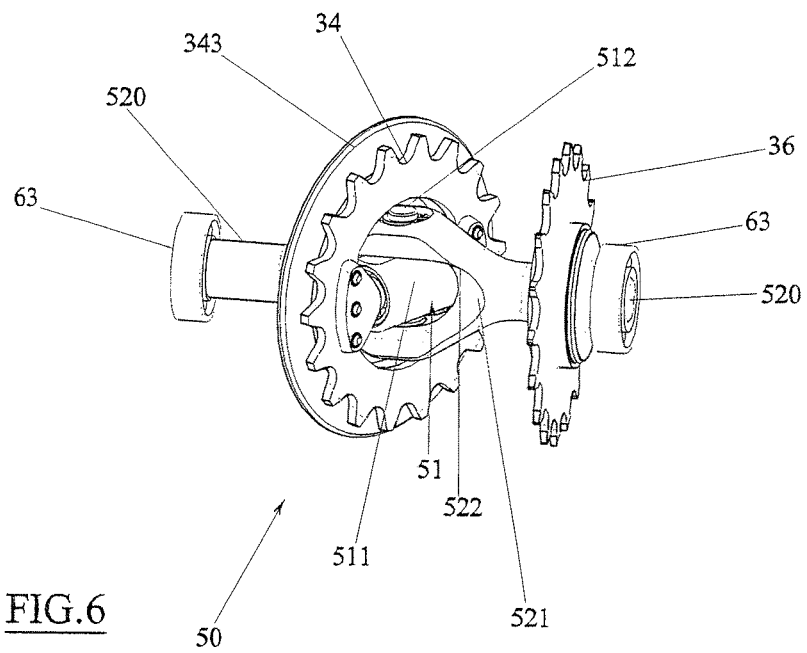
FIG. 6 is a frontal axonometric view of the universal joint of the invention.
Figure 7:
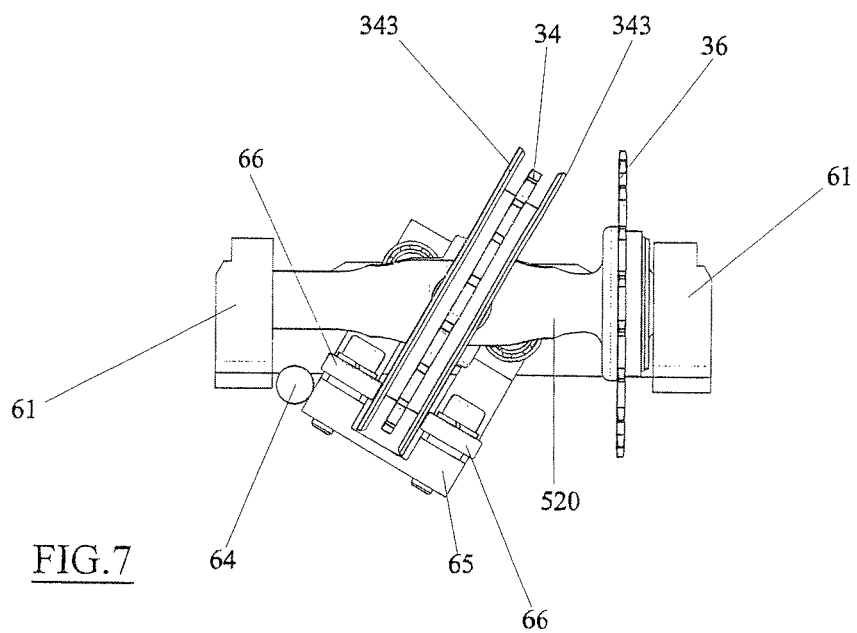
FIG. 7 is a detail from above of the intermediate chain rings of the transmission group of the invention.
Figure 8:
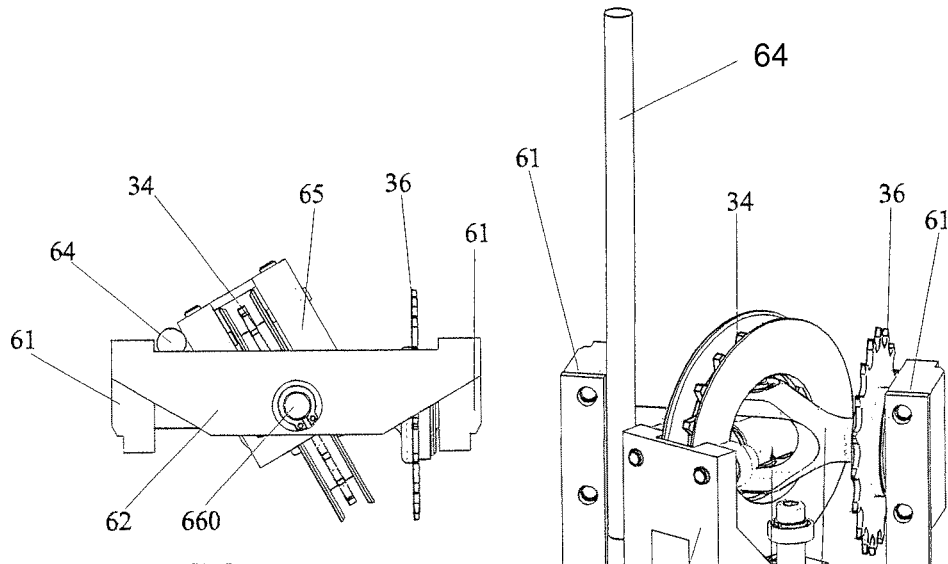
FIG. 8 is a view from below of FIG. 7.
Figure 9:
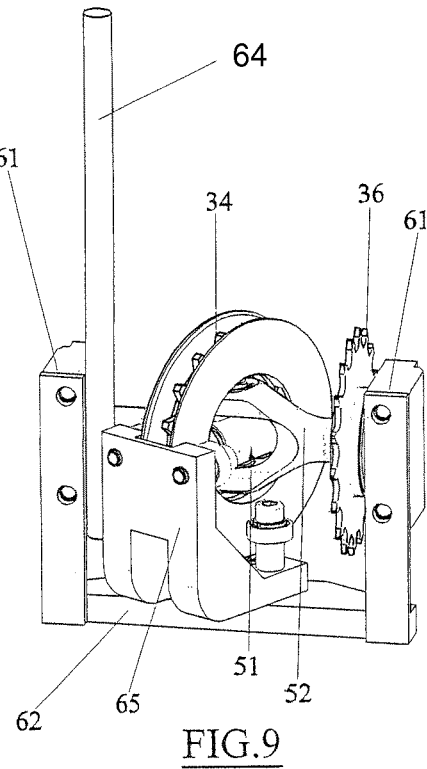
FIG. 9 is a front view of FIG. 7.
Figure 10:
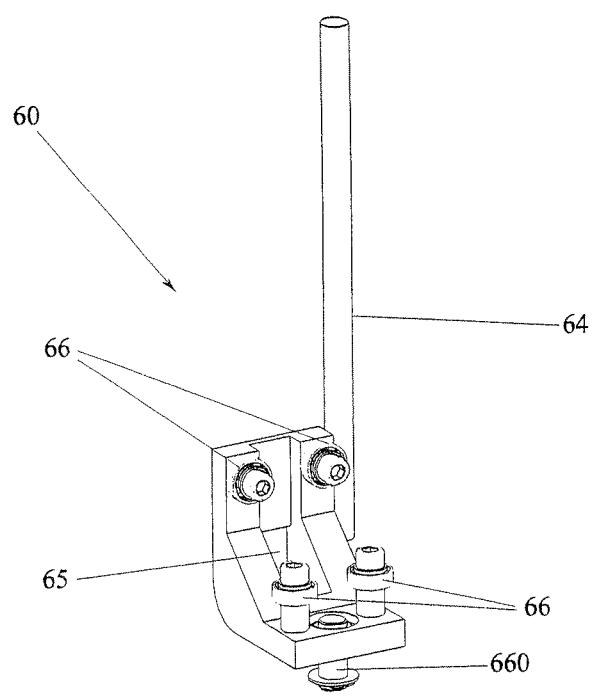
FIG. 10 is an axonometric view of a first embodiment of the rotation limiting means of the first intermediate chain ring of the invention.

With particular reference to the figures, 10 denotes in its entirety a vehicle, for example a three-wheeled vehicle, such as for example a recumbent bicycle, servo-assisted and/or pedal-powered, a moped or the like.

The bicycle 10 comprises a bearing frame 21, which comprises a longitudinal upright supported by a pair of rear wheels (not illustrated) and hinged frontally to a fork 22 supporting a front steer wheel 23.

The fork 22 comprises an upper sleeve 24 inserted in a bushing 25 realised in the frame 21, in which it is blocked axially and free to rotate with respect to a steering axis X.

The fork 22 is, in the illustrated example, damped, and in particular comprises two telescopic arms (per side) with variable length in opposition to mechanical means and/or hydraulic means and/or resistant pneumatic means.

The frame 21 is able to support a seat (not shown) and steering means, such as a handlebar or a pair of handles, able to command rotation of the fork 22 with respect to the steering axis X.

The frame 21 comprises a pair of shelves 26 (or tubular elements or the like) which are fixed rigidly to the upright and branch inferiorly (or superiorly or frontally) thereto.

Advantageously but not limitingly the frame 21 is of an oscillating type, i.e. the rear wheels can oscillate with respect to a substantially parallel axis to the longitudinal axis of the upright which defines the frame 21.

The vehicle 10 further comprises a drive transmission group 30 which is described in detail in the following.

The drive transmission group 30 comprises at least a drive chain ring 31 which is rotatably supported by the pair of shelves 26 (not indispensable, as they could be realised by the frame 21 if appropriately profiled).

The pair of pedals 32 is fixed, as known to the expert in the sector, solidly in rotation with the drive chain ring 31 and rotatable with respect to the frame 21.

The drive transmission group 30 further comprises a driven chain ring 33, for example exhibiting a number of cogs that is lower than the number of cogs of the drive chain ring 31, which is associated, solidly in rotation and coaxially, to the front wheel 23.

The drive transmission group 30, as can be seen in figures from 5 to 10, comprises an at least first intermediate chain ring 34, which is associated to the frame 21 rotatably with respect to the central axis thereof, but constrained thereto such as to be substantially parallel (and aligned) to the drive chain ring 31 (in practice being rotatably associated to the fork 22 with respect to the steering axis X thereof).

The transmission group 30 comprises a first flexible organ 35, for example a chain or a belt or a further flexible organ, loop-closed and wound about a drive chain ring 31 and to the first intermediate chain ring 34, which first flexible organ 35 is able to transfer the rotation drive imparted by the drive chain ring 31 to the intermediate chain ring 34.

The transmission group 30 further comprises a second intermediate chain ring 36, which is associated to the fork 22 rotatably with respect to the central axis thereof, but constrained thereto, both in rotation with respect to the steering axis X and in translation, such as to be substantially parallel (and substantially aligned) to the driven chain ring 33.

The transmission group 30 comprises a second flexible organ 37, for example a chain or a belt or another flexible organ, loop-closed and wound about the driven chain ring 33 and the second intermediate chain ring 36, which second flexible organ 37 is able to transfer the rotation motion which is imparted by the second intermediate chain ring 36 (by the first intermediate chain ring 34, as will be described in the following) to the drive chain ring 33 and then to the front wheel 23.

Respective chain-stretchers can be associated to the frame 21 and/or the fork 22, able to respectively tension the first flexible organ 35 and/or the second flexible organ 37.

The drive transmission group 30 comprises a universal joint 50 comprising a spider 51, on a first arm 511 of which the first intermediate crown 34 is associated, rotatably with respect to the axis of the first arm 511, and on the second arm 512 of which the second intermediate crown 36 is associated, rotatably with respect to the axis of the second arm.

In particular, the first intermediate crown 34 is concentric to the spider 51.

In practice, the first intermediate crown 34 lies on a plane containing the axis of the first arm 511 of the spider 51.

The first intermediate chain ring 34, therefore, also function as a fork for the universal joint 50, directly transferring the drive from the first intermediate chain ring to the spider 51, without interposing further fork organs and universal shafts.

The first intermediate chain ring 34 comprises a central cavity 340 from which two diametrically-opposite radial pins 341 project, which pins 341 have first ends thereof facing towards the centre of the first intermediate chain ring 34.

Each pin 341 is, for example, fixed to the first intermediate chain ring 34 by means of screws (for example 3 in number).

The first arm 511 of the spider 51 is substantially hollow (at least at the free ends thereof), such that the ends of the first arm 511 can house the pins 341.

The pins 341 are then rotatably inserted internally of the cavity of the first arm 511 by interposing respective bearings 342, and the first arm 511 is blocked in translation between the two pins 341.

The first intermediate chain ring 34 further comprises a pair of annular bodies 343, coaxial and fixed at opposite sides of the first intermediate chain ring, able to keep the first flexible organ 35 enmeshed on the first intermediate chain ring.

The first arm 511 comprises a through-cavity 513 with an axis perpendicular to the axis of the first arm and located in a central position (the central axis of which intersects the axis of the first arm 511 at the centre of the spider 51, i.e. at the centre of the first intermediate chain ring 34).

In particular, the second arm 512 (substantially cylindrical) is inserted in the through-cavity 513 of the first arm 511, for example with a transition fit, such that the ends of the second arm 512 project externally of the first arm.

The universal joint 50 comprises a fork organ 52 rotatably coupled to the ends of the second arm 512 of the spider 51.

The fork organ 52 comprises a central shaft 520 provided with a central bifurcation 521 defining a substantially circular eyelet 522 located in the central portion of the central shaft.

In practice, the fork organ 52 is conformed as a head joint of two symmetrical forks.

The fork organ 52 comprises, at the central bifurcation 521, a cylindrical through-seating 523 with an axis perpendicular to the axis of the central shaft 520 (and the eyelet 522) which defines two cylindrical cavities on each branch of the central bifurcation 521. Each cylindrical seating 523 is able to house internally thereof the free ends of the second arm 512 of the spider 51, for example by interposing two respective bearings 524 blocked axially by suitable blocking organs.

In practice, the fork organ 52 is rotatably coupled to the second arm 512.

The second intermediate chain ring 36 is coaxially splined on one of the end portions of the central shaft 520.

In particular, a cylindrical broadening 525 is defined on the end portion of the central shaft 520, on which the second intermediate chain ring 36 is inserted and blocked, for example by left-handed threads or another reciprocal blocking systems.

The free ends of the central shaft 520 are rotatably connected, with respect to the axis of the central shaft, to the fork 22, as will be more fully described in the following.

The fork 22 comprises support means 60 able to support the universal joint 50.

In particular, the support means 60 comprise two parallel and separate uprights 61 rising from a crossbar 62.

The uprights 61 and/or the crossbar 62 are rigidly constrained to the fork 22, for example inferiorly of the bifurcated portion of the lower arms thereof which support the front wheel 23.

A respective cylindrical seating 610 is defined on each upright 61, in which a respective end of the central shaft 520 is inserted, for example by interposing suitable bearings 63, such that the uprights 61 support the central shaft 520 is rotation with respect to the axis thereof.

The support means 60 further comprise limiting means of the rotation of the first intermediate chain rings 34 with respect to the steering axis X.

In practice, the limiting means are able to maintain the first intermediate chain ring 34 substantially parallel to the drive chain ring 31 also during steering of the front wheel 23.

In a first embodiment, illustrated in FIGS. 1-10, the limiting means comprise a longitudinal appendage 64 (for example having a circular section) inserted in a sleeve 27 fixed to the frame 21, such that it can slide with respect to the frame, and provided with a cradle 65 which defines at least two lateral walls able to embrace the first intermediate chain ring 34 on opposite sides.

The cradle 65 is constrained in translation and hinged to the crossbar 62, by means of a hinge pine 660 coaxial (and/or parallel) to the steering axis X of the front wheel 23 (i.e. the fork 22 with respect to the frame 21).

In this way, the cradle 65 maintains the first intermediate chain ring 34 aligned with the frame 21 also during the steering of the front wheel 23.

The cradle 65 comprises revolving means, such as further bearings 66 (for example four in number, i.e. two per side) able to roll, substantially without dragging, on the lateral walls of the first intermediate chain ring 34, in particular on the annular bodies 343 thereof.

Figure 11:
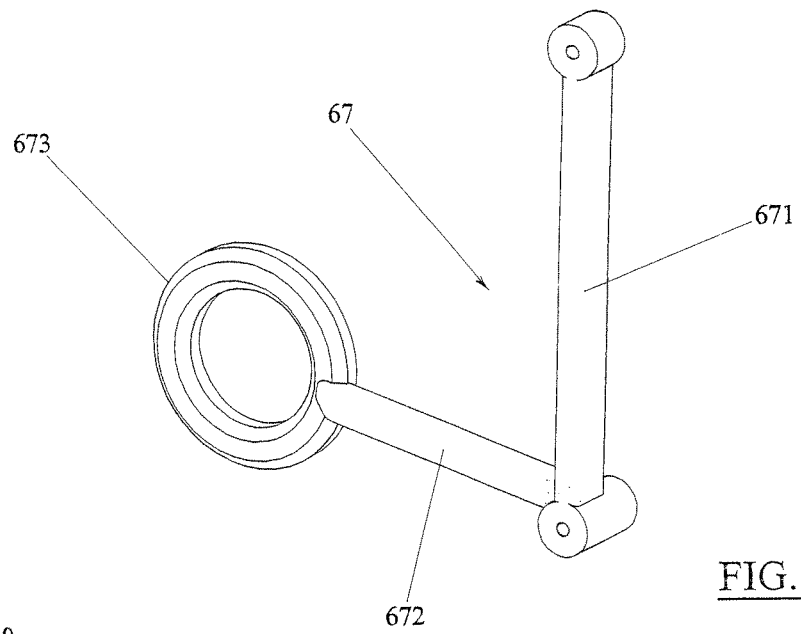
FIG. 11 is an axonometric view of a second embodiment of the limiting means of the rotation of the first intermediate chain ring, according to the invention.
Figure 12:
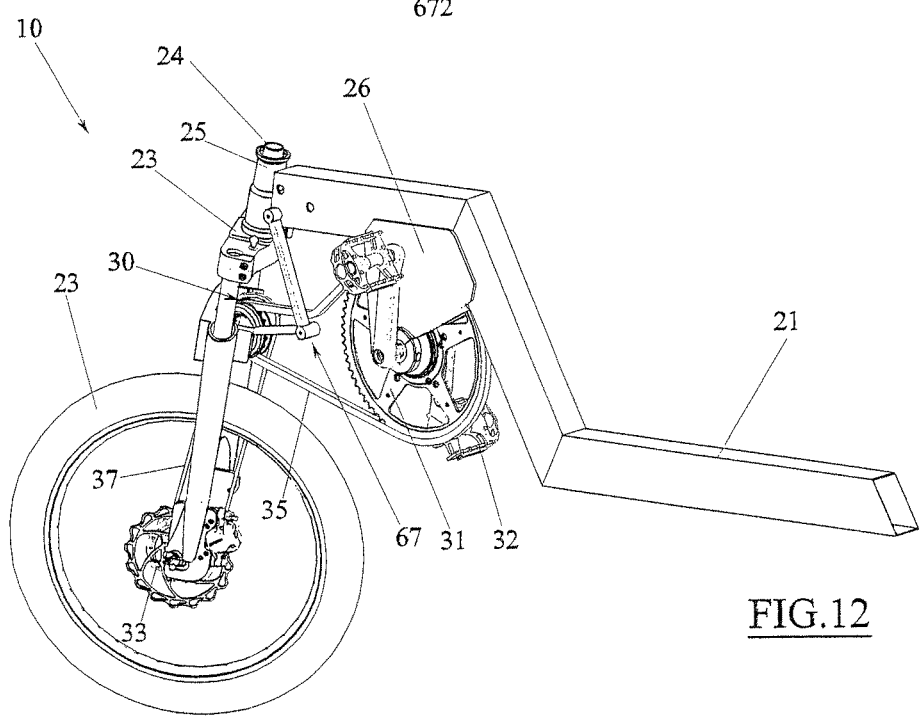
FIG. 12 is a lateral view of the front portion of a vehicle of the invention provided with the limiting means of FIG. 11.

In a second embodiment shown in FIGS. 11-12, the limiting means comprise an articulated appendage 67 comprising a first portion 671, hinged to the frame 21 with respect to a first axis, that is substantially parallel to the rotation axis of the drive chain ring 31, and a second portion 672, hinged to the first portion 671 with respect to a second axis, parallel to the first axis.

A circular chain ring 673 is constrained to the free end of the second portion 672, which can be splined with play on the central shaft 520 and be rested on a flank of the first intermediate chain ring 34 (in particular of one of the annular bodies 343) in order to maintain it aligned with the frame 21 also during the steering of the front wheel 23.

Thus, apart from the function of the limitation of the rotation of the first intermediate chain ring 34, the sliding of the appendage 64 or the articulation of the articulated appendage 67 enable displacement of the fork 22 along the steering axis X with respect to the frame 21, enabling use in the vehicle 10 of damped forks.

The vehicle 10 can further comprise abutting means, such as ratchets, guides or other types, for example fixed to the frame 21, able to define a lateral abutting element for the first flexible organ 35, such as to keep the flexible organ 35 on the first intermediate chain ring 34 and the drive chain ring 31.

In the embodiment of figures from 1 to 10, the abutting means are defined by the cradle 65 which comprises a through-opening for the passage of the first flexible organ 35, the lateral walls of the cradle functioning as a guide and abutting element for the first flexible organ.

Further, the vehicle 10 can comprise at least a motor, for example an electric motor, which can assist the pedal motion, for example by activating the drive chain ring 31 in rotation, as known to the technical expert in the sector.

Alternatively the vehicle 10 might not comprise pedals, but could be a motor cycle, with the drive chain ring 31 directly activated by a motor, for example electric and/or internal combustion.

Further, the use of a plurality of driven chain rings 33 could be used, with a gear reducer, for varying the transmission ratio between the drive chain ring 31 and the driven chain ring 33, as known to the expert in the sector.

In the light of the foregoing, the functioning of the drive transmission group 30 of the vehicle 10 is as follows.

By activating the drive chain ring 31 in rotation, for example by means of the pedals 32, the first intermediate chain ring 34 is rotated by means of the first flexible organ 35.

The rotation of the first intermediate chain ring 34 with respect to the axis thereof transfers the rotary motion to the central shaft 520 and from this to the intermediate chain ring 36.

The rotation of the second intermediate chain ring 36 is transferred to the driven chain ring 33 by means of the second flexible organ 37 and from there to the front wheel 23, i.e. the drive wheel of the vehicle 10.

When the vehicle proceeds along a straight trajectory the first and the second intermediate wheel 34 and 36 are flanked to one another, coaxial and parallel; should a steering action be imparted on the front wheel 23 the second intermediate wheel 36 rotates, identically to the front wheel 23 with respect to the first intermediate wheel 34.

The invention as it is conceived is susceptible to numerous modifications and variants, all falling within the scope of the inventive concept.

Further, all the details can be replaced by other, technically equivalent elements.

In practice the materials used, as well as the contingent forms and dimensions, can be any according to requirements without forsaking the protective scope of the following claims.

The invention claimed is:

1. A drive transmission group (30) to a steer wheel (23) of a vehicle (10) which comprises:
    at least a drive chain ring (31) associable to actuating means (32) in rotation able to impart a rotary motion to the chain ring (31),
    at least a driven chain ring (33) solidly associated in rotation coaxially to the steer wheel (23),
    at least a first intermediate chain ring (34) and a second intermediate chain ring (36) connected respectively to the drive chain ring (31) and to the driven chain ring (33) by means of respective flexible organs (35, 36),
    a universal joint (50) comprising a spider (51) on a first arm (511) of which the first intermediate chain ring (34) is associated, rotatably with respect to an axis of the first arm (511), and on a second arm (512) of which the second intermediate chain ring (36) is associated, rotatably with respect to an axis of the second arm,
    wherein the first intermediate chain ring (34) is concentric to the spider (51), and
    wherein revolving organs (342) are interposed between the first arm (511) and the first intermediate chain ring (43).

2. The group (30) of claim 1, wherein the revolving organs comprise at least a pair of bearings (342) respectively associated to opposite ends of the first arm (511) and in diametrically opposite points of the first chain ring (34).

3. A vehicle (10) comprising a frame (21) supported by at least a rear wheel and at least a front steer wheel (23) which comprises a drive transmission group (30), according to claim 1.

4. The vehicle (10) of claim 3, further comprising actuating means (32) mechanically connected to the drive chain ring (31) for activating the chain ring (31) in rotation.

5. The vehicle (10) of claim 4, wherein the actuating means comprise a pair of pedals (32) rotatably associated to the frame (21) and coaxially solid with the drive chain ring (31).

6. The vehicle (10) of claim 3, further comprising a fork (22) able to rotatingly support the front wheel (23) and hinged to the frame (21) with respect to a steering axis (X), the universal joint (50) being supported by the fork (22).

7. The vehicle (10) of claim 6, wherein the second arm (512) of the spider (50) is hinged, with respect to the axis of the second arm, to a fork organ (52) of the universal joint (50) in turn rotatably supported by the fork (22).

8. The vehicle (10) of claim 3, further comprising limiting means (60) of the rotation of the first intermediate chain ring (34) with respect to the steering axis (X).

9. The vehicle (10) of claim 8, wherein the limiting means (60) comprise at least a longitudinal appendage (64) inserted in a sleeve (27) fixed to the frame (21) and provided with a cradle (65) able to embrace the first intermediate chain ring (34) from opposite sides.

10. The vehicle (10) of claim 9, wherein the cradle (25) comprises revolving means (66) able to roll, substantially without dragging, on lateral walls of the first intermediate chain ring (34).

11. The vehicle (10) of claim 9, wherein the appendage (64) is slidably inserted in the sleeve (27) with respect to the longitudinal axis of the appendage.

12. The vehicle (10) of claim 6, wherein the universal joint (50) is associated to the fork (22) in a zone thereof located inferiorly along the steering axis (X) with respect to the hinging point of the fork (22) to the frame (21).

* * * * *